United States Patent [19]

Saito et al.

[11] 4,308,353

[45] Dec. 29, 1981

[54] THERMOPLASTIC STYRENE POLYMER AND GRAFTED BLOCK COPOLYMER COMPOSITIONS

[75] Inventors: Akira Saito, Fujisawa; Akio Yamori, Kawasaki; Hideo Morita, Yokohama, all of Japan

[73] Assignee: Asahi Kasei Kogyo Kabushiki Kaisha, Osaka, Japan

[21] Appl. No.: 231,335

[22] Filed: Feb. 4, 1981

[30] Foreign Application Priority Data

Feb. 13, 1980 [JP] Japan .................................. 55-15411
Feb. 13, 1980 [JP] Japan .................................. 55-15412

[51] Int. Cl.³ ..................... C08L 53/02; C08L 51/00; C08L 25/04
[52] U.S. Cl. ........................................ 525/74; 525/78; 525/71
[58] Field of Search ............................... 525/74, 78, 71

[56] References Cited

U.S. PATENT DOCUMENTS 3,488,405  1/1970  Trementozzi et al. ............... 525/74
4,197,376  4/1980  Lee et al. .................................. 525/74

*Primary Examiner*—Carman J. Seccuro
*Attorney, Agent, or Firm*—Birch, Stewart, Kolasch & Birch

[57] ABSTRACT

A thermoplastic styrene polymer composition having excellent mechanical and processing properties is presented. This composition contains:

(A) 1 through 99% by weight of a component A consisting essentially of at least one styrene polymer selected from the group consisting of polystyrene and styrene-containing polymers having a weight-average molecular weight of 50,000 through 500,000; and (B) 99 through 1% by weight of a component B consisting essentially of at least one ionically crosslinked product of at least one modified block copolymer with at least one univalent, bivalent or trivalent metal ion, said modified block copolymer comprising a block copolymer of at least one aromatic vinyl compound and at least one conjugated diene compound onto which at least one molecular unit containing at least one dicarboxylic acid group or the derivative thereof is grafted.

28 Claims, No Drawings

THERMOPLASTIC STYRENE POLYMER AND GRAFTED BLOCK COPOLYMER COMPOSITIONS

BACKGROUND OF THE INVENTION

1. Field of the Invention

The present invention relates to a novel thermoplastic polymer composition. More specifically, it relates to a thermoplastic polymer composition containing (i) styrene polymer and (ii) an ionically crosslinked product of a modified block copolymer of an aromatic vinyl compound and a conjugated diene compound, which is modified with a dicarboxylic acid or derivative thereof. The term "styrene polymer" as used herein means both polystyrene and styrene-containing copolymer.

2. Description of the Prior Art

Polymer compositions of (i) styrene polymers, typically polystyrene and (ii) block copolymers of aromatic vinyl compounds and conjugated diene compounds, typically styrene-butadiene block copolymers containing up to 70% by weight, preferably up to 50% by weight, of styrene are known. These polymer compositions are useful as those in which the impact resistance of the styrene polymers is improved when the styrene polymers are present as a major constituent in the compositions. Contrary to this, in the case where the block copolymers of aromatic vinyl compounds and conjugated diene compounds, which are a so-called "thermoplastic elastomer", are present as a major constituent in the compositions, such compositions are known as those in which the hardness, tensile strength, oil resistance and other properties are improved as compared with the block copolymers. In addition to the above-mentioned characteristics, since the polymer compositions containing both styrene polymers and the aromatic vinyl compound-conjugated diene compound block copolymer can be readily molded or processed, these polymer compositions are widely utilized as various molding materials, in the fields of, for example, food containers, packaging materials, toys and ordinary utensils.

Furthermore, block copolymers of aromatic vinyl compounds and conjugated diene compounds having a conjugated diene content of about 30% by weight or less are resinous and are noted as those in which the impact resistance of the styrene polymers is improved, while the transparency of the styrene polymers, especially polystyrene is retained. The compositions of (i) the above-mentioned resinous block copolymers of aromatic vinyl compounds and conjugated diene compounds and (ii) styrene polymers such as general-purpose polystyrene or high-impact polystyrene are also known as compositions having transparency and impact resistance and suitable for use in the fields of various molded articles.

Previously, we found that polymer compositions of (i) styrene polymers and (ii) modified block copolymers of aromatic vinyl compounds and conjugated diene compounds which are modified with unsaturated carboxylic acids or the derivatives thereof had improved mechanical and chemical properties as compared with polymer compositions of the styrene polymers and the aromatic vinyl compound-conjugated diene compound block copolymers.

However, the above-mentioned polymer compositions still do not satisfactorily meet the recent demand in the fields of various molding materials.

SUMMARY OF THE INVENTION

Accordingly, an object of the present invention is to comply with the above-mentioned demand and to provide thermoplastic styrene polymer compositions having further improved mechanical properties such as impact resistance, without losing the desired properties of the conventional styrene polymer compositions such as good processability or moldability.

Other objects and advantages of the present invention will be apparent from the following description.

In accordance with the present invention, there is provided a thermoplastic styrene polymer composition comprising:

(A) 1 through 99% by weight of a component A consisting essentially of at least one styrene polymer selected from the group consisting of polystyrene and styrene-containing polymers having a weight-average molecular weight of 50,000 through 500,000; and (B) 99 through 1% by weight of a component B consisting essentially of at least one ionically cross-linked product of at least one modified block copolymer with at least one univalent, bivalent or trivalent metal ion, said modified block copolymer comprising a block copolymer of at least one aromatic vinyl compound and at least one conjugated diene compound onto which at least one molecular unit containing at least one dicarboxylic acid group or the derivative thereof is grafted.

DETAILED DESCRIPTION OF THE INVENTION

The present invention will now be better understood from the detailed description set forth below.

STYRENE POLYMER

The styrene polymers used, as component A, in the polymer compositions of the present invention include polymers having a weight-average molecular weight ($\overline{Mw}$) of 50,000 through 500,000, such as polystyrene and copolymers containing styrene as a monomer component. These polymers can be used alone or in any mixture thereof.

Typical examples of the styrene polymers are those which are conventionally used as molding materials, such as, polystyrene (general-purpose polystyrene), acrylonitrile-styrene copolymers, styrene-$\alpha$-methylstyrene copolymers, styrene-maleic anhydride copolymers, methyl methacrylate-styrene copolymers as well as those which are reinforced with a rubber component, such as, high-impact polystyrenes, ABS resins, MBS resins, styrene-butadiene copolymer resins. In addition to the above-mentioned polymers, any styrene polymers can be used as component A in the present invention, so long as such polymers are thermoplastic.

Among the above-mentioned styrene polymers, styrene polymers containing 50% by weight or more of styrene can preferably be used as component A in the present invention. Especially, polystyrene and high-impact polystyrenes are most preferable from the point of view of their availability.

The weight-average molecular weight ($\overline{Mw}$) of the styrene polymers should be within the range of from 50,000 to 500,000. In a case where the weight-average molecular weight is less than 50,000, the mechanical strength of the present polymer compositions is not sufficient for practical use. Contrary to this, if the weight-average molecular weight is more than 500,000, the processability or moldability of the present polymer composition becomes poor. The weight-average molecular weight of the styrene polymers is more preferably within the range of from 100,000 to 400,000 from the point of view of the desired balance of the mechanical strength and the processability or moldability.

IONICALLY CROSSLINKED PRODUCT

The component B used in the present thermoplastic styrene polymer compositions are ionically crosslinked products of modified vinyl aromatic compound-conjugated diene compound block copolymers with univalent, bivalent or trivalent ions. The block copolymers of vinyl aromatic compounds and conjugated diene compounds are referred to as "block copolymers" or "unmodified block copolymers" hereinbelow. The term "modified block copolymers" used herein means grafted copolymers obtained by grafting molecular units containing dicarboxylic acid groups or the derivatives thereof onto said unmodified block copolymers. The term "ionically crosslinked products" or "ionically crosscrosslinked modified block copolymers" used herein means those which are obtained by ionically crosslinking said modified block copolymers with at least one metal ion selected from the group consisting of univalent, bivalent and trivalent metal ions. The dicarboxylic acid groups or the derivatives thereof act as crosslinking points.

The metal ions used in the ionic crosslinking reaction include univalent metal ions of Group I, II and III of the Periodic Table, such as, $Li^+$, $Na^+$, $K^+$, $Cs^+$, $Ag^+$ and $Cu^+$ and bivalent or trivalent ions of Group II, III and VIII of the Periodic Table, such as $Mg^{2+}$, $Ca^{2+}$, $Zn^{2+}$, $Al^{3+}$. These univalent, bivalent and trivalent metal ions can be used alone or in any mixture thereof. These metal ions are ionically bonded to the modified block copolymers.

The ionically crosslinked products of the modified block copolymers used in the present invention can be prepared by crosslinking the modified block copolymers via ionic bondings with any compounds of univalent, bivalent and/or trivalent metals capable of forming ionic bonds as crosslinking agents. In the crosslinking reaction, the dicarboxylic acid groups or the derivatives thereof of the modified block copolymers are ionized by the addition of the crosslinking agent compounds to form carboxylic acid ion. The ionization amount or degree can be controlled by the addition amount of the crosslinking agent compounds. The ionization amount can be determined by the use of, for example, an infrared spectrophotometer.

The addition amount of the crosslinking agent compounds is determined so that the partial or the total amounts of the dicarboxylic acid groups, or the derivatives thereof, contained in the modified block copolymers are theoretically ionized. The ionization reaction substantially quantitatively proceeds. However, an excess amount of the crosslinking agents may be preferably used to obtain the desired ionization amount.

In order to effectively obtain the ionically crosslinked modified block copolymers, the mol ratio of the metal components in the metallic compounds (i.e. the crosslinking agent) to the dicarboxylic acid groups, or the derivatives thereof, contained in the modified block copolymers is preferably within the range of from 0.1 to 3.0. In a case where the mol ratio of the metal components to the dicarboxylic acid groups or the derivatives thereof is less than 0.1, the heat resistance, the oil resistance and the mechanical properties of the compositions cannot be satisfactorily improved. Contrary to this, in a case where said mol ratio is more than 3, the flow properties of the compositions decrease and, therefore, the processability or moldability become less satisfactory.

The crosslinking agent compounds used for the preparation of the ionically crosslinked modified block copolymers include the compounds of metals of univalent, bivalent and trivalent compounds as mentioned hereinabove. These metallic compounds can be used alone or in any mixtures thereof. Although any metallic compounds of univalent, bivalent and trivalent metal ions can be used in the preparation of the ionically crosslinked modified block copolymers, the hydroxides, carboxylates and alcoholates of univalent metals and the hydroxides and carboxylates of bivalent and trivalent metals can be preferably used in the ionic crosslinking of the modified block copolymers from the point of view of the crosslinking reactivity.

Among the above-mentioned ionically crosslinking products, the ionically crosslinking products crosslinked with univalent metal ions can be preferably used in the present thermoplastic polymer compositions due to the fact that the mechanical properties and the processability or moldability of the compositions are preferably balanced.

The ionically crosslinked products of the modified block copolymers can be prepared by various methods. For instance, the crosslinking agent compounds can be added to the molten modified block copolymers to effect the crosslinking reaction. Alternatively, the modified block copolymers are dissolved in an appropriate solvent and, then, the crosslinking agent compounds are added to the resultant solution to effect the crosslinking reaction. Furthermore, the crosslinking agent compounds can be added to the modified block copolymers in the form of a latex to effect the crosslinking reaction.

The above-mentioned ionically crosslinked products thereof, can be used as the component B of the present thermoplastic styrene polymer compositions, alone or in any mixtures thereof.

The above-mentioned ionically crosslinked products of the modified block copolymers are thermoplastic and can be processed or molded at an elevated temperature. Furthermore, the ionic crosslinking of the ionically crosslinked products is reversible. These characteristics essentially distinguished the ionically crosslinked products of the modified block copolymers utilized in the present invention from conventional crosslinked products of aromatic vinyl compound-conjugated diene compound block copolymers obtained from conventional irreversible crosslinking such as sulfur crosslinking (or vulcanization), peroxide crosslinking (or vulcanization) or radiation crosslinking.

MODIFIED BLOCK COPOLYMER

The precursor of the ionically crosslinked modified block copolymers, that is, the modified block copolymers can be obtained by the addition reaction of unsaturated dicarboxylic acids, or the derivatives thereof, to the block copolymers of aromatic vinyl compounds and conjugated diene compounds. These dicarboxylic acids, or the derivatives thereof, are addition reacted or grafted to the conjugated diene portions of the block copolymers at the active unsaturated positions thereof. These dicarboxylic acids, or the derivatives thereof, are preferably grafted to the block copolymer in an amount such that 1 through 50, more preferably 1 through 30, and most preferably 1 through 20 units of the dicarboxylic acid groups or the derivatives thereof (in terms of dicarboxylic acid), on an average, are contained in one molecule of the block copolymers. When the amount of the dicarboxylic acid groups or the derivatives thereof is less than one unit per one molecule of the block copolymer, the modification effect cannot be obtained, whereas when the amount is more than 50 units per one molecule of the block copolymer, further improvement cannot be obtained.

Typical examples of the dicarboxylic acids and the derivatives thereof, used in the present invention are dicarboxylic acids such as maleic acid, fumaric acid, chloromaleic acid, itaconic acid, cis-4-cyclohexene-1,2-dicarboxylic acid, endo-cis-bicyclo [2,2,2]-5-heptene-2,3-dicarboxylic acid and the anhydrides, the esters, the amides and the imides thereof. Preferable dicarboxylic acids and the derivatives thereof, are maleic acid, fumaric acid and maleic anhydride.

The modified block copolymers used in the present invention can be obtained by reacting the block copolymers of aromatic vinyl compounds and conjugated diene compounds with the dicarboxylic acids or the derivatives thereof, in a molten state or in a solution with or without using a free-radical initiator. Although there is no limitation in the production processes of the modified block copolymers in the present invention, production processes which produce the modified block copolymers, containing undesirable materials such as gels or having a poor flowability and processability, are not preferable for use in the present invention. For this purpose, the addition reaction can be advantageously carried out in a molten state by using, for example, an extruder under the condition that no substantial amount of free radicals is generated. For instance, as disclosed in the specification of our prior co-pending application, U.S. Ser. No. 089,237, the addition reaction can be conducted, without using free radical initiators such as peroxides and azo compounds, by using, for example, an extruder in a molten state under the condition that no substantial amount of free radicals is generated in the system by using a free radical inhibitor or conventional stabilizers (e.g. phenol type, phosphorous type, amine type stabilizers).

BLOCK COPOLYMER

The block copolymers of aromatic vinyl compounds and conjugated diene compounds comprise one or more, preferably two or more, of polymer blocks which mainly contain aromatic vinyl compounds, and one or more of polymer blocks which mainly contain conjugated diene compounds. These block copolymers can be typically prepared by an anionic polymerization in which lithium compounds are used as a polymerization catalyst.

The weight ratio of the aromatic vinyl compounds to the conjugated diene compounds is within the range of from 5/95 to 95/5, preferably 10/90 to 90/10, and more preferably 15/85 to 85/15. In a case where said weight ratio of the aromatic vinyl compounds/the conjugated diene compounds is less than 5/95, the compatibility of the ionically crosslinked modified block copolymers to the styrene polymers becomes worse. Contrary to this, in a case where said weight ratio is more than 95/5, the reinforcing effect of the ionically crosslinked modified block copolymers to the styrene polymers is not sufficient. Among these block copolymers, those containing 70% by weight or less, preferably 60% by weight or less, of the aromatic vinyl compounds are rubber-like polymers and those containing more than 70% by weight of the aromatic vinyl compounds are transparent high-impact resins. These conditions are maintained even after modification.

The polymer blocks mainly consisting of the aromatic vinyl compounds (which are referred to as "aromatic vinyl blocks") in the block copolymers constitute hard segments of the block copolymers and the glass transition temperature thereof is 40° C. or more, preferably 60° C. or more. The weight ratio of the aromatic vinyl compounds to the conjugated diene compounds in the polymer blocks is within the range of from 60/40 to 100/0, preferably 80/20 to 100/0 and more preferably 100/0. The distribution of the minor constituent in this polymer block (i.e. the conjugated diene compounds) may be random, tapered (that is, the amount of the monomer component gradually increases or decreases along the molecular chain), partial block or any combination thereof.

On the other hand, the polymer blocks mainly consisting of the conjugated diene compounds (which are referred to as "diene blocks") in the block copolymers constitute soft segments of the block copolymers and the glass transition temperature thereof is 0° C. or less, preferably $-20°$ C. or less. The weight ratio of the conjugated diene compounds to the aromatic vinyl compounds in the polymer blocks is within the range of from 0/100 to 40/60, preferably 0/100 to 30/70. The distribution of the minor constituent in this polymer block (i.e. the aromatic vinyl compounds) may be random, tapered, partial block or any combination thereof. In the case where two or more of the aromatic vinyl blocks or the diene blocks are contained in the block copolymers, each block may be either in the same or different structures.

The weight ratio of the aromatic vinyl blocks to the diene blocks is preferably within the range of from 5/95 to 95/5, more preferably 10/90 to 90/10.

The aromatic vinyl compounds used in the block copolymers include, for example, styrene, α-methylstyrene, vinyl toluene, p-tert-butylstyrene and the like. These compounds can be used alone or in any mixture thereof. The most preferable aromatic vinyl compound is styrene. On the other hand, the conjugated diene compounds used in the block copolymers include, for example, butadiene, isoprene, 1,3-pentadiene and the like. These compounds can be used alone or in any mixture thereof. The preferred conjugated diene compound is butadiene or a mixture thereof with the other conjugated diene compound(s) mainly containing butadiene.

The number-average molecular weight of each polymer block in the block copolymers is preferably within the range of from 1,000 to 300,000, more preferably 2,000 to 200,000, and most preferably 3,000 to 100,000. The number-average molecular weight of the total block copolymer is preferably within the range of from 10,000 to 1,000,000, more preferably 20,000 to 300,000 and most preferably 30,000 to 250,000. The molecular weight distribution (i.e. the ratio of the weight-average molecular weight to the number-average molecular weight) of the block copolymers is preferably within the range of from 1.01 to 10, more preferably within 1.01 to 5.

Furthermore, the molecular structure of the block copolymers can be in the form of a linear structure, a branched structure, a radial type structure, which is obtained by the use of a polyfunctional coupling agent, or any combination thereof. These block copolymers may be conventionally modified with organic or inorganic compounds so long as the desired properties or characteristics of the block copolymers are not impaired.

The preferable limitations with respect to the block copolymers mentioned hereinabove is desirable for obtaining the thermoplastic styrene polymer compositions of the present invention having the desired mechanical properties and processing or molding properties.

THERMOPLASTIC STYRENE POLYMER COMPOSITION

As mentioned hereinabove, the thermoplastic styrene polymer compositions of the present invention contain (A) 1 through 99% by weight, preferably 2 through 98% by weight of the styrene polymers as component A and (B) 99 through 1% by weight, preferably 98 through 2% by weight of the ionically crosslinked products of the modified block copolymers.

When the total amount of the conjugated diene compounds contained in the thermoplastic styrene polymer composition of the present invention is 40% by weight or less, preferably 2 through 40% by weight and more preferably 3 through 30% by weight, based on the total weight of the thermoplastic polymer composition, the thermoplastic polymer compositions in which the transparency or the impact resistance of the styrene polymers is improved can be provided. The content of the conjugated diene compounds in the thermoplastic polymer compositions of the present invention can be readily controlled by adjusting the mixing or compounding ratio of the ionically crosslinked product of the modified block copolymer having a predetermined conjugated diene compound content and the styrene polymers or by adjusting the conjugated diene compound content of the ionically crosslinked product component to the desired value by using two or more ionically crosslinked products each having a different conjugated diene compound content. For instance, the thermoplastic polymer composition having a butadiene content of 15% by weight can be prepared by mixing 25 parts by weight of the ionically crosslinked product having a butadiene content of 60% by weight and 75 parts by weight of polystyrene or by mixing 50 parts by weight of the ionically crosslinked product having a butadiene content of 30% by weight and 50 parts by weight of polystyrene.

According to the present invention the transparency and the impact resistance of the thermoplastic polymer compositions can be advantageously and desirably controlled in the above-mentioned conjugated diene content of the thermoplastic polymer composition by using the ionically crosslinked products of the modified block copolymers having different degrees of crosslinking. The degree of crosslinking of the ionically crosslinked products can be controlled by the amount of the dicarboxylic acid groups or the derivatives thereof grafted to the modified block copolymers and the ionization degree thereof.

In the case where the degree of the ionization of the carboxylic acid groups or the derivatives thereof (or the amount of the ionized dicarboxylic acid groups) is within the range of from about 0.5 to about 2 groups per one molecule of the modified block copolymers, the thermoplastic polymer compositions containing the ionically crosslinked products of the same have improved transparency, as compared with those containing the unmodified block copolymer instead of the ionically crosslinked products of the modified block copolymers. On the other hand, when the amount of the ionized dicarboxylic acid groups is more than about 2, preferably more than about 4, based on one molecule of the modified block copolymers, the thermoplastic polymer compositions containing the ionically crosslinked product of the same have improved impact resistance and tensile strength, as compared with those containing the unmodified block copolymers instead of the ionically crosslinked products of the modified block copolymers.

In the case where the ionically crosslinked product of the latter modified block copolymers having the relatively high degree of the crosslinking are used, it is preferable for obtaining the thermoplastic styrene polymer compositions having excellent impact resistance that the thermoplastic styrene polymer compositions have such morphology that the ionically crosslinked products of the modified block copolymers are present as a dispersion phase in the form of regularly and irregularly shaped particles having an average diameter of 0.2 through 10 microns, preferably 0.5 through 5 microns.

In the case where the amount of the conjugated diene compounds contained in the thermoplastic polymer composition of the present invention is more than 40% by weight, preferably more than 40% by weight but not more than 95% by weight and more preferably 45 through 90% by weight, the thermoplastic polymer compositions of the present invention are elastomeric. These elastomeric compositions have improved mechanical strengths, heat resistance (i.e. an improved tensile strength at an elevated temperature) and oil resistance, as compared with the block copolymers of aromatic vinyl compounds and conjugated diene compounds and the polymer compositions mainly containing the same. The above-mentioned elastomeric polymer compositions of the present invention preferably have a hardness of 30 through 100, more preferably 45 through 100, as determined according to JIS (Japanese Industrial Standards)-K-6301 in order to obtain the polymer compositions having the more desirable mechanical properties. The mechanical properties, heat resistance and processability or moldability of the above-mentioned elastomeric polymer compositions of the present invention can be readily and desirably controlled by adjusting the mixing or compounding ratio of the ionically crosslinked products of the modified block copolymers and the styrene polymers and by changing the degree of the crosslinking of the ionically crosslinked products of the modified block copolymers.

The present polymer compositions containing the ionically crosslinked products can be also prepared, for example, by mixing the styrene polymers and the uncrosslinked modified block copolymers to form compositions followed by ionically crosslinking the modified block copolymers in the resultant compositions. Furthermore, the present polymer compositions containing the ionically crosslinked products can be further prepared by: first mixing the styrene polymers and the unmodified block copolymers of aromatic vinyl compounds and conjugated diene compounds to form polymer compositions; then, modifying the block copolymers in the resultant polymer compositions with unsaturated dicarboxilic acids or the derivatives thereof and; finally, ionically crosslinking the modified block copolymers in the polymer compositions.

The thermoplastic polymer compositions of the present invention can be readily prepared by using any conventional mixing apparatus which is usually used for mixing or blending of polymer substances. Examples of such apparatus are single or multiple screw extruders, mixing rolls, Banbury mixers, kneaders and the like. Although the mixing or blending of the present polymer composition can be preferably effected in the molten state, the mixing can be also effected by using the solution or latex of each component, followed by the removal of the solvents in any known manner.

The polymer compositions of the present invention can further contain other conventional additives. Examples of such additives are reinforcing materials such as silica, carbon blacks, clays, glass fibers, organic fibers, calcium carbonate and the like, as well as fillers, antioxidants, UV absorbers, pigments, lubricants, fire retardants and other additives. However, since the processability or moldability of the present polymer compositions is impaired and the mechanical strengths of the molded compositions decreased when adhesives, tackifiers and the like are added to the compound, the incorporation of the adhesives, tackifiers and the like into the present polymer compositions should be avoided.

The resinous thermoplastic polymer compositions of the present invention having a relatively low content of the conjugated diene compounds can be readily molded or formed, as molding materials, into various kinds of useful articles by using any conventional molding or forming techniques, including compression molding, extrusion molding, injection molding and the like. The present resinous thermoplastic polymer compositions can be used in the form of films, sheets and various molded articles in the various fields of, for example, packaging materials, mechanical parts, ordinary utensils, toys and the like.

On the other hand, the elastomeric polymer compositions of the present invention having a relatively high content of the conjugated diene compounds can be preferably used in the fields of, for example, footwears, belts, insulation materials, sponge materials, packings, balls, toys, medical equipment and accessories and the like. These elastomeric polymer compositions can also be molded by using, for example, injection molding, compression molding and the like.

The present invention will now be further illustrated by, but is by no means limited to, the Examples set forth below.

PREPARATION EXAMPLE 1

Preparation of Modified Block Copolymer

Modified block copolymers (samples PA) were prepared by modifying a thermoplastic elastomer sample p of styrene-butadiene block copolymer with maleic anhydride in the manner set forth hereinbelow.

The sample p of the styrene-butadiene block copolymer was prepared by polymerizing styrene and butadiene in a hexane solution in the presence of, as a polymerization catalyst, n-butyl lithium. The sample p was believed to have the following structure in view of the polymerization method and various analytical data.

(1) Polymer Structure: $B_1—S_1—B_2—S_2$ (linear)

| | |
|---|---|
| $B_1$ = 18% by weight | [B]/[S] = 16/2 (tapered) |
| $S_1$ = 17% by weight | [B]/[S] = 0/17 |
| $B_2$ = 49% by weight | [B]/[S] = 46/3 (tapered) |
| $S_2$ = 16% by weight | [B]/[S] = 0/16 | wherein $B_n$ is a polymer block containing, as a main constituent, butadiene, $S_n$ is a polymer block containing, as a main constituent, styrene, an integer n is an order of the blocks along the block copolymer chain, [B] is a content of butadiene based on the total weight of the block copolymer and S is a content of styrene based on the total weight of the block copolymer. These notations are also used hereinbelow in the same way.

(2) Styrene Content: 38% by weight
(3) Block Styrene Content: 33% by weight
(4) Weight-Average Molecular Weight (Mw): 81,000
(5) Number-Average Molecular Weight ($M_n$): 62,000
(6) Melt Index (JIS-K-6870, 5 kg load, 200° C.): 11.0 g/10 min.

1.5 parts by weight of maleic anhydride, 0.5 parts by weight of BHT (butylhydroxytoluene) and 0.1 part by weight of phenothiazine, which serve as a gellation preventing agent, were added to 100 parts by weight of the styrene-butadiene block copolymer sample p, and the mixture was homogeneously blended together in a mixer.

The mixture was supplied to a 40 mm screw extruder (single, full-flighted screw, L/D=24) in a nitrogen atmosphere at a cylinder temperature of from 195° to 205° C., to effect the modification reaction of the block copolymer with maleic anhydride. The resulting polymer mixture was dried under reduced pressure to remove the unreacted maleic anhydride from the mixture. The modified block copolymer sample PA thus obtained has a melt index of 8.2 g/10 min., a toluene-insoluble matter of 0.02% by weight and a grafted amount of maleic anhydride (determined by the titration of sodium methylate) of 0.60 parts by weight per 100 parts by weight of the block copolymer.

PREPARATION EXAMPLE 2

Preparation of Ionically Crosslinked Product of Modified Block Copolymer (I)

The modified block copolymer sample PA obtained hereinabove was dissolved in toluene to form a 20% by weight solution. To this solution, a sodium methylate solution in a toluene-methanol mixture solvent was added as a crosslinking agent in an amount listed in Table 1 below. The mixture was allowed to react at room temperature to effect the ionic crosslinking reaction. The solvent was removed from the reaction mixture.

Thus, the ionically crosslinked products P-I through P-IV listed in Table 1 below were obtained. The ionic crosslinking of the sodium ion to the acid anhydride group of the modified block copolymer was confirmed by an infrared spectrum.

TABLE 1

| Sample No. of Ionically Crosslinked Product | P-I | P-II | P-III | P-IV |
|---|---|---|---|---|
| Sample No. of Starting Modified Block Copolymer | PA | PA | PA | PA |

TABLE 1-continued

| Crosslinking Agent | CH$_3$ONa | CH$_3$ONa | CH$_3$ONa | CH$_3$ONa |
|---|---|---|---|---|
| Addition Amount* of Crosslinking Agent (Parts by Weight) | 0.083 | 0.165 | 0.331 | 0.661 |
| Molar Ratio of Crosslinking Agent/Acid Anhydride | 0.25 | 0.50 | 1.0 | 2.0 |
| Melt Index (g/10 min.) of Ionically Crosslinked Product | 5.6 | 2.4 | 0.21 | 0.01 |

*Parts by weight based on 100 parts by weight of the modified block copolymer

EXAMPLES 1, 2 AND COMPARATIVE 1 to 2 in which the unmodified block copolymer and the modified block copolymer were used.

TABLE 2

| | | Example | | Comparative Example | |
|---|---|---|---|---|---|
| Example No. | | 1 | 2 | 1 | 2 |
| Component B | Sample No. | P-1 | P-2 | P | PA |
| | Type of Sample | Ionically Crosslinked Product | Crosslinked | Unmodified Copolymer | Modified Copolymer |
| | Melt Index (g/10 min.) | 5.6 | 2.4 | 11.0 | 8.2 |
| Component A/Component B | (Weight Ratio) | 85/15 | 85/15 | 85/15 | 85/15 |
| Physical Properties of Composition Sheet | Tensile Yield Strength (kg/cm$^2$) (lengthwise/crosswise) | 345/270 | 341/265 | 321/257 | 336/261 |
| | Tensile Break Strength (kg/cm$^2$) (lengthwise/crosswise) | 267/219 | 268/215 | 239/197 | 253/212 |
| | Elongation at Break (%) (lengthwise/crosswise) | 37/19 | 38/22 | 35/18 | 36/20 |
| | Dart Impact Strength (kg . cm) | 19 | 18 | 11 | 15 |
| | Transparency Total Light Transmission (%) | 73.5 | 71.9 | 62.1 | 70.3 |
| | Haze (%) | 23.2 | 25.5 | 45.1 | 29.5 |
| | Melt Index (g/10 min.) | 4.8 | 4.3 | 5.2 | 5.0 |

EXAMPLES 1, 2

The compositions of Examples 1 and 2 as well as Comparative Examples 1 and 2 were prepared in the form of sheets by using, as component B, the samples P-I and P-II and, for comparative purposes, the unmodified block copolymer sample p and the modified block copolymer sample PA and using, as component A, a general-purpose polystyrene (STYRON 683 ®) available from Asahi Dow Co., melt index of 2.5 g/10 min., $\overline{Mw}=260,000$). The mixture of component A with component B in a weight ratio (A/B) of 85/15 was extrusion-molded to form a sheet having a thickness of 0.40 mm through a 25 mm screw extruder provided with a T-die at a die temperature of 200° C.

The physical properties of the sheet thus obtained are listed in Table 2 below.

It will be obvious from Table 2 that the compositions of Examples 1 and 2 obtained by using the ionically crosslinked product having improved tensile strength and impact strength and good transparency, as compared with the compositions of Comparative Examples

PREPARATION EXAMPLE 3

Preparation of Ionically Crosslinked product of Modified Block Copolymer (II)

The unmodified styrene-butadiene block copolymer samples p through v listed in Table 3 below were modified with maleic anhydride in a manner as described in Preparation Example 1. Thus, the modified block copolymers sample PB and Q through V listed in Table 3 below were obtained. The properties of these unmodified and modified block copolymers are set forth in Table 3.

The modified block copolymers were ionically crosslinked with the crosslinking agents listed in Table 4 below under the conditions listed in Table 4 below. Thus, ionically crosslinked products P-V, P-VI, P-VII, Q-I, R-I, S-I, T-I, U-I and V-I were obtained. The melt indexes of these products are set forth in Table 4. Although the melt indexes of these products were low, these products were able to be compression molded.

TABLE 3

| | Sample No. | p | q | r | s |
|---|---|---|---|---|---|
| Unmodified Block Copolymer | Block Orientation | B$_1$—S$_1$—B$_2$—S$_2$ (linear) | (S$_1$—B$_1$)$_4$—Si (radial) | S$_1$—B$_1$—S$_2$ (linear) | B$_1$—S$_1$—B$_2$—S$_2$ (linear) |
| | Structure, Weight % and Monomer Content of Each Block Component | See Preparation Example 1 | S$_1$ = 7.5 wt. % [B]/[S] = 0/7.5 B$_1$ = 17.5 wt. % [B]/[S] = 17.5/0 Living polymer S$_1$—B$_1$—Li was coupled with SiCl$_4$ | S$_1$ = 8 wt. % [B]/[S] = 0/8 B$_1$ = 80 wt. % [B]/[S] = 80/0 S$_2$ = 12 wt. % [B]/[S] = 0/12 | B$_1$ = 10 wt. % [B]/[S] = 8/2 Random S$_1$ = 25 wt. % [B]/[S] = 5/20 Random B$_2$ = 40 wt. % [B]/[S] = 32/8 Random S$_2$ = 25 wt. % [B]/[S] = 5/20 Random |
| | Styrene Content (wt. %) | 38 | 30 | 20 | 50 |
| | Melt Index (g/10 min.) | 11.0 | 7.7 | 1.3 | 8.3 |
| | Sample No. | PB | Q | R | S |
| Modified Block | Addition Amount* of Maleic Anhydride | 0.51 | 1.25 | 0.35 | 0.67 |

TABLE 3-continued

| copolymer | Melt Index (g/10 min.) | 9.2 | 2.3 | 0.8 | 6.6 |
|---|---|---|---|---|---|

| | | Sample No. | t | u | v |
|---|---|---|---|---|---|
| Unmodified Block Copolymer | Block Orientation | | $B_1$—$S_1$ (linear) | $S_1$—$B_1$—$S_2$ (linear) | $B_1$—$S_1$—$B_2$—$S_2$ (linear) |
| | Structure, Weight % and Monomer Content of Each Block Component | | $B_1$ = 55 wt. % [B]/[S] = 35/20 Tapered $S_1$ = 45 wt. % [B]/[S] = 0/45 | $S_1$ = 40 wt. % [B]/[S] = 0/40 $B_1$ = 15 wt. % [B]/[S] = 15/0 $S_2$ = 45 wt. % [B]/[S] = 5/40 Tapered | $B_1$ = 8 wt. % [B]/[S] = 6/2 Tapered $S_1$ = 23 wt. % [B]/[S] = 0/23 $B_2$ = 27 wt. % [B]/[S] = 24/3 Tapered $S_2$ = 42 wt. % [B]/[S] = 0/42 |
| | Styrene Content (wt. %) | | 65 | 80 | 68 |
| | Melt Index (g/10 min.) | | 3.4 | 5.6 | 3.7 |
| | | Sample No. | T | U | V |
| Modified Block Copolymer | Addition Amount* of Maleic Anhydride | | 0.92 | 0.60 | 0.55 |
| | Melt Index (g/10 min.) | | 2.5 | 3.3 | 2.8 |

*Parts by weight based on 100 parts by weight of unmodified block copolymer

TABLE 4

| Sample No. of Ionically Crosslinked Product | | P-V | P-VI | P-VII | Q-I | R-I | S-I | T-I | U-I | V-I |
|---|---|---|---|---|---|---|---|---|---|---|
| Ionic Cross-linking Reaction | Sample No. of Modified Block Copolymer | PB | PB | PB | Q | R | S | T | U | V |
| | Crosslinking Agent | NaOH | NaOH | NaOH | $CH_3COONa$ | $CH_3COONa$ | NaOH | $CH_3ONa$ | KOH | NaOH |
| | Additional Amount* of Crosslinking Agent | 0.31 | 0.42 | 0.42 | 1.10 | 0.29 | 0.27 | 0.76 | 0.69 | 0.34 |
| | Crosslinking Agent/ Acid Anhydride (Molar Ratio) | 1.5 | 2.0 | 2.0 | 1.0 | 1.0 | 1.0 | 1.5 | 2.0 | 1.5 |
| | Crosslinking Reaction Condition | Toluene Solution Room Temp. 1 hr. | Molten State (Brabender Plastograph) 200° C. 5 min. | Molten State (Brabender Plastograph) 200° C. 5 min. | Molten State (Mixing Roll) 160° C. 15 min. | Molten State (Mixing Roll) 160° C. 15 min. | Molten State (Mixing Roll) 160° C. 15 min. | Molten State (Brabender Plastograph) 200° C. 5 min. | Molten State (Brabender Plastograph) 200° C. 5 min. | Molten State (Brabender Plastograph) 200° C. 5 min. |
| Melt Index of Ionically Crosslinked | | 0.02 | 0.01 | 0.01 | 0.005 | 0.04 | 0.13 | 0.03 | 0.02 | 0.06 |

*Parts by weight based on 100 parts by weight of ionically crosslinked product.

EXAMPLES 3-7 AND COMPARATIVE EXAMPLES 3-5

The compositions of Examples 3-7 and Comparative Examples 3-5 were prepared by using, a component B, the ionically crosslinked product samples P-IV, P-V, P-VI, P-VII and Q and, for comparative purposes, the unmodified block copolymer samples p and q and using, as component A, general-purpose polystyrene (STYRON 683 ® available from Asahi Dow Co., melt index of 2.5 g/10 min., $\overline{Mw}$=260,000). The components A and B were mixed or kneaded by using a mixing roll at a temperature of 160° C. for 15 min. The composition ratio, butadiene content and physical properties of the compositions thus obtained are set forth in Table 5 below.

It should be noted from the results in Table 5 that, the composition of Example 3 as compared with that of Comparative Example 3, the compositions of Examples 4, 5 and 6 as compared with that of Comparative Example 4 and the composition of Example 7 as compared with that of Comparative Example 5 have a remarkably high impact strength and also have an improved stiffness as shown in the tensile strength data. A composition having a high izod impact strength and tensile strength as in the composition of the present invention was difficult to obtain from a conventional general-purpose polystyrene and a conventional styrene-butadiene block copolymer. However, styrene polymer compositions having excellent mechanical properties can be obtained by the use of the ionically crosslinked products according to the present invention.

It was also confirmed from electron microscopic observation of the compositions of Examples 3 through 7 that the ionically crosslinked products were dispersed in the polystyrene matrix in the form of regularly and irregularly shaped particles having a diameter of about 0.5 through 4 microns. Contrary to this, the block copolymers in the compositions of Comparative Examples 3 through 5 were dispersed in the form of spheres or rods having a diameter of less than 0.1 micron.

TABLE 5

| | Example | | | | | Comparative Example | | |
|---|---|---|---|---|---|---|---|---|
| Example No. | 3 | 4 | 5 | 6 | 7 | 3 | 4 | 5 |
| Sample No. of Component B | P-IV | P-V | P-VI | P-VII | Q | p | p | q |
| Type of Component B | Ionically Crosslinked Product | | | | | Unmodified Block Copolymer | | |
| Component A/Component B (Weight Ratio) | 85/15 | 75/25 | 75/25 | 75/25 | 80/20 | 85/15 | 75/25 | 80/20 |
| Butadiene Content in Composition (wt. %) | 9.2 | 15.3 | 15.3 | 15.3 | 13.7 | 9.3 | 15.4 | 14 |
| Physical Melt Index (g/10 min.) | 2.2 | 2.0 | 1.8 | 1.6 | 2.1 | 5.2 | 6.3 | 4.9 |

TABLE 5-continued

| | | Example | | | | | Comparative Example | | |
|---|---|---|---|---|---|---|---|---|---|
| Example No. | | 3 | 4 | 5 | 6 | 7 | 3 | 4 | 5 |
| Properties | Izod Impact Strength (kg . cm/cm, notched) | 5.0 | 24.0 | 22.3 | 17.8 | 14.4 | 1.5 | 4.0 | 3.6 |
| | Tensile Yield Strength (kg/cm$^2$) | 330 | 216 | 247 | 255 | 251 | 320 | 195 | 192 |
| | Tensile Break Strength (kg/cm$^2$) | 304 | 189 | 210 | 218 | 212 | 295 | 185 | 190 |
| | Elongation at Break (%) | 10 | 20 | 14 | 13 | 10 | 3 | 12 | 11 |

PREPARATION EXAMPLE 4

Preparation of Ionically Product of Modified Block Copolymer (III)

The modified block copolymer sample PA obtained in Preparation Example 1 and the various modified block copolymer samples PB and Q through U listed in Table 3 above were ionically crosslinked with the bivalent or trivalent crosslinking agents shown in Table 6 below under the conditions listed in Table 6. Thus, ionically crosslinked products P-VIII, P-IX, P-X, P-XI, Q-II, R-II, S-II, T-II and U-II were obtained. All these products were able to be press molded.

TABLE 6

| Sample No. of Ionically Crosslinked Product | | P-VIII | P-IX | P-X | P-XI | Q-II |
|---|---|---|---|---|---|---|
| Ionic Crosslinking Reaction | Sample No. of Modified Block Copolymer | PA | PA | PA | PB | Q |
| | Crosslinking Agent | Mg(CH$_3$COO)$_2$ . 4H$_2$O | Mg(CH$_3$COO)$_2$ . 4H$_2$O | Mg(CH$_3$COO)$_2$ . 4H$_2$O | Zn(CH$_3$COO)$_2$ . 2H$_2$O | Mg(OH)$_2$ |
| | Addition Amount* of Crosslinking Agent | 0.33 | 0.66 | 1.31 | 1.14 | 0.60 |
| | Crosslinking Agent/ Acid Anhydride (Molar Ratio) | 0.25 | 0.5 | 1.0 | 1.0 | 0.8 |
| | Crosslinking Reaction Condition | Molten State (Brabender Plastograph) 200° C. 10 min. | | | Molten State (Mixing Roll) 160° C. 15 min. | Toluene Solution Room Temp. 1 hr. |

| Sample No. of Ionically Crosslinked Product | | R-II | S-II | T-II | U-II |
|---|---|---|---|---|---|
| Ionic Crosslinking Reaction | Sample No. of Modified Block Copolymer | R | S | T | U |
| | Crosslinking Agent | Hg(OH)$_2$ | Al(OH)$_3$ | Mg(CH$_3$COO)$_2$ . 4H$_2$O | Mg(OH)$_2$ |
| | Addition Amount* of Crosslinking Agent | 0.25 | 0.11 | 0.80 | 0.66 |
| | Crosslinking Agent/ Acid Anhydride (Molar Ratio) | 1.2 | 0.2 | 0.4 | 0.5 |
| | Crosslinking Reaction Condition | Molten State (Mixing Roll) 160° C. 15 min. | | Molten State (Brabender Pastograph) 200° C. 10 min. | |

*Parts by weight based on 100 parts by weight of ionically crosslinked product.

EXAMPLE 8 AND COMPARATIVE EXAMPLES 6 AND 7

The compositions of Example 8 and Comparative Examples 6 and 7 were prepared by using, as component B, the ionically crosslinked product sample P-VIII and, for comparative purposes, the unmodified block copolymer sample p and the modified block copolymer sample PA and using, as component A, general-purpose polystyrene (STYRON 683 ® available from Asahi Dow Co., melt index of 2.5 g/10 min., $\overline{Mw}=260,000$). The components A and B were kneaded by using a mixing roll at a temperature of 160° C. for 15 min. The compositions were compression molded and the mechanical properties and transparency (0.3 mm thick sample) thereof were determined. The results are shown in Table 7 below.

It should be noted from the results shown in Table 7 that the composition of Example 8, in which the ionically crosslinked product was used according to the present invention, has an improved tensile strength and impact resistance and exhibits good transparency, as compared with those of Comparative Examples 6 and 7.

TABLE 7

| | Example | Comparative Example | |
|---|---|---|---|
| Example No. | 8 | 6 | 7 |
| Sample No. of Component B | P-VIII*1 | p*2 | PA*3 |
| Component A/Component B (Weight Ratio) | 85/15 | 85/15 | 85/15 |
| Physical Properties | | | |
| Tensile Yield Strength (kg/cm$^2$) | 330 | 320 | 325 |
| Tensile Break Strength (kg/cm$^2$) | 308 | 295 | 303 |
| Elongation at Break (%) | 8 | 3 | 6 |
| Izod Impact Strength (kg . cm/cm, notched) | 2.2 | 1.5 | 1.9 |
| Melt Index (g/10 min.) | 4.6 | 5.2 | 5.0 |
| Transparency | | | |
| Total Light Transmission (%) | 73 | 64 | 71 |

TABLE 7-continued

| Example No. | Example 8 | Comparative Example 6 | Comparative Example 7 |
|---|---|---|---|
| Haze (%) | 22 | 42 | 28 |

*[1] Ionically Crosslinked Product
*[2] Unmodified Block Copolymer through 11 that the ionically crosslinked products were dispersed in the polystyrene matrix in the form of particles having a diameter of about 0.5 through 5 microns. Contrary to this, the block copolymers in the compositions of the Comparative Examples 8 and 9 were dispersed in the form of spheres or rods having a diameter of less than 0.1 micron.

TABLE 8

| | | Example | | | Comparative Example | |
|---|---|---|---|---|---|---|
| Example No. | | 9 | 10 | 11 | 8 | 9 |
| Sample No. of Component B | | P-X | P-XI | Q-II | p | q |
| Type of Component B | | Ionically Crosslinked Product | | | Unmodified Block Copolymer | |
| Component A/Component B (Weight Ratio) | | 75/25 | 75/25 | 80/20 | 75/25 | 80/20 |
| Butadiene Content of Composition (wt. %) | | 15.3 | 15.3 | 13.9 | 15.4 | 14 |
| Physical Properties | Melt Index (g/10 min.) | 2.3 | 2.0 | 2.4 | 6.3 | 4.7 |
| | Izod Impact Strength (kg . cm/cm, notched) | 13.7 | 12.3 | 10.7 | 4.0 | 3.6 |
| | Tensile Yield Strength (kg/cm$^2$) | 243 | 232 | 256 | 195 | 192 |
| | Tensile Break Strength (kg/cm$^2$) | 216 | 209 | 227 | 185 | 190 |
| | Elongation at Break (%) | 17 | 16 | 15 | 12 | 11 |

*[3] Modified Block Copolymer

EXAMPLES 9 THROUGH 11 AND COMPARATIVE EXAMPLES 8 AND 9

The compositions of Examples 9 through 11 as well as Comparative Examples 8 and 9 were prepared by using, as component B, the ionically crosslinked product samples P-X, XI and Q-II and, for comparative purposes, the unmodified block copolymer samples p and q and using, as component A, general-purpose polystyrene (STYRON 683 ®) available from Asahi Dow Co., melt index of 2.5 g/10 min., $\overline{Mw}$=260,000). The components A and B were kneaded by using a mixing roll at a temperature of 160° C. for 15 min. Thus, the compositions shown in Table 8 below were obtained. The physical properties of these compositions are also set forth in Table 8.

It should be noted from the results in Table 8 that the compositions of Examples 9 and 10, as compared with that of Comparative Example 8, and the composition of Example 11, as compared with that of Comparative Example 9, have an extremely high impact resistance and also have improved stiffness as shown in the tensile strength data. Thus, styrene polymer compositions having improved and excellent mechanical properties, as compared with those containing conventional styrene-butadiene block copolymers, can be obtained by the use of ionically crosslinked products according to the present invention.

It was also observed from the electron microscopic investigation of the compositions of Examples 9

EXAMPLES 12 THROUGH 16 AND COMPARATIVE EXAMPLES 10 THROUGH 12

The compositions of Examples 12 through 16 and Comparative Examples 10 through 12 were prepared by using, as component B, the ionically crosslinked product samples P-VI and S-I shown in Table 4 and P-X and S-II shown in Table 6 and, for comparative purposes, the unmodified block copolymer samples p and s and using, as component A, high-impact polystyrene (STYRON 492 ®) available from Asahi Dow Co., Mw of resin component=240,000) or a mixture of said high-impact polystyrene and general-purpose polystyrene (STYRON 683 ®) available from Asahi Dow Co., $\overline{Mw}$=260,000). The components A and B were kneaded by using a 30 mm dual screw extruder at a temperature of 200° C. After pelletizing, the pellets were compression molded. The physical properties of the compression molded compositions thus obtained are shown in Table 9 below.

It should be noted from the results in Table 9 that the compositions of Examples 12 through 16 in which the ionically crosslinked products were compounded, as compared with the compositions of Comparative Examples 10 through 12 in which the unmodified block copolymers were compounded, have a remarkably improved impact resistance and also have an improved tensile strength. Thus, it is clear that the ionically crosslinked products are suitable for use in the modification of the high-impact polystyrene or the mixture of the general-purpose polystyrene and the high-impact polystyrene.

TABLE 9

| | | Example | | | | | Comparative Example | | | Reference | |
|---|---|---|---|---|---|---|---|---|---|---|---|
| Example No. | | 12 | 13 | 14 | 15 | 16 | 10 | 11 | 12 | 1 | 2 |
| Composition | High-Impact Polystyrene (wt. %) | 90 | 45 | 92 | 45 | 92 | 90 | 45 | 92 | 50 | 100 |
| | General-Purpose Polystyrene (wt. %) | 0 | 45 | 0 | 45 | 0 | 0 | 45 | 0 | 50 | 0 |
| | Sample No. of Component B | P-VI | P-VI | S-I | P-X | S-II | P | p | s | — | — |
| | Type of Component B | Ionically Crosslinked Product | | | | | Unmodified Block Copolymer | | | — | — |
| | Amount of Component B (wt. %) | 10 | 10 | 8 | 10 | 8 | 10 | 10 | 8 | — | — |
| Butadiene Content of Composition* (wt. %) | | 8.8 | 6.3 | 9.0 | 6.3 | 9.0 | 8.8 | 6.3 | 9.0 | 2.5 | 5.0 |
| Physical Properties | Izod Impact Strength (kg . cm/cm, notched) | 13.8 | 11.6 | 15.0 | 10.9 | 14.1 | 9.2 | 6.9 | 9.9 | 2.8 | 6.3 |
| | Tensile Yield Strength (kg/cm$^2$) | 218 | 250 | 212 | 251 | 215 | 195 | 243 | 201 | 290 | 230 |

TABLE 9-continued

| Example No. | Example | | | | | Comparative Example | | | Reference | |
|---|---|---|---|---|---|---|---|---|---|---|
| | 12 | 13 | 14 | 15 | 16 | 10 | 11 | 12 | 1 | 2 |
| Tensile Break Strength (kg/cm²) | 225 | 240 | 219 | 239 | 216 | 190 | 226 | 193 | 285 | 225 |
| Elongation at Break (%) | 25 | 12 | 23 | 10 | 21 | 15 | 8 | 14 | 6 | 15 |

*Content of butadiene (5 wt. %) contained in high-impact polystyrene is added.

EXAMPLES 17 THROUGH 21 AND COMPARATIVE EXAMPLES 13 THROUGH 15

The compositions of Examples 17 through 21 and Comparative Examples 13 through 15 were prepared by using, as component B, the ionically crosslinked product samples P-III, P-IX, R-I and R-II and, for comparative purposes, the unmodified block copolymer samples p and r and using, as component A, general-purpose polystyrene (STYRON 679®) available from Asahi Dow Co., melt index of 27 g/10 min., $\overline{Mw}$=180,000). The components A and B were mixed under molten condition by using a mixing roll at a temperature of 160° C. for 15 min. The physical properties of the compositions thus obtained are shown in Table 10 below.

It should be noted from the results in Table 10 that the compositions of Examples 17 through 21, as compared with the compositions of Comparative Examples 13 through 15, have an improved tensile strength, 300% modulus and hardness and also have excellent oil resistance and excellent retention of tensile strength at an elevated temperature. Thus, the present compositions are very useful.

EXAMPLES 22 THROUGH 28 AND COMPARATIVE EXAMPLES 16 THROUGH 19

The compositions of Examples 22 through 28 and Comparative Examples 16 through 19 were prepared by using, as component B, the ionically crosslinked product samples T-I, T-II, U-I and U-II having a large styrene content and shown in Tables 4 and 6 and, for comparative purposes, the unmodified block copolymer samples t and u and using, as component A, general-purpose polystyrene (STYRON 683®) available from Asahi Dow Co., $\overline{Mw}$=260,000) and/or high-impact polystyrene (STYRON 492®) available from Asahi Dow Co., $\overline{Mw}$ of resin component=240,000). The components A and B were kneaded by using a mixing roll at a temperature of 180° C. for 10 min. The compositions were compression molded. The physical properties of the molded compositions thus obtained are shown in Table 11 below.

It should be noted from the results in Table 11 that the compositions of Examples 22 through 28, as compared with the compositions of Comparative Examples 16 through 19, have an improved impact resistance and similar or better transparency.

TABLE 10

| Example No. | | Example | | | | | Comparative Example | | |
|---|---|---|---|---|---|---|---|---|---|
| | | 17 | 18 | 19 | 20 | 21 | 13 | 14 | 15 |
| Sample No. of Component B | | P-III | P-III | R-I | P-IX | R-II | p | p | r |
| Type of Component B | | Ionically Crosslinked Product | | | | | Unmodified Block Copolymer | | |
| Component A/Component B (Weight Ratio) | | 10/90 | 25/75 | 30/70 | 10/90 | 30/70 | 10/90 | 25/75 | 30/70 |
| Physical Properties | Hardness at 25° C. (JIS) | 86 | 90 | 87 | 87 | 87 | 83 | 86 | 84 |
| | 300% Modulus at 25° C. (kg/cm²) | 35 | 46 | 40 | 40 | 48 | 31 | 35 | 33 |
| | Tensile Strength at 25° C. (kg/cm²) | 170 | 190 | 185 | 159 | 170 | 140 | 145 | 130 |
| | Elongation at Break at 25° C. (%) | 850 | 800 | 750 | 870 | 720 | 800 | 760 | 770 |
| | Oil Resistance* (increase in weight %) | 30 | 16 | 27 | 33 | 31 | 54 | 45 | 51 |
| | Tensile Strength at 50° C. (kg/cm²) | 106 | 131 | 122 | 109 | 119 | 60 | 76 | 55 |
| | Retention of Tensile Strength at 50° C. (%) | 62 | 69 | 66 | 68 | 70 | 43 | 46 | 42 |

*Dipped in JIS No. 3 oil at 25° C. for 24 hours

TABLE 11

| Example No. | | Example | | | | | | | Comparative Example | | | |
|---|---|---|---|---|---|---|---|---|---|---|---|---|
| | | 22 | 23 | 24 | 25 | 26 | 27 | 28 | 16 | 17 | 18 | 19 |
| Composition | High-Impact Polystyrene (wt. %) | 15 | 0 | 10 | 15 | 15 | 0 | 10 | 15 | 0 | 10 | 5 |
| | General-Purpose Polystyrene (wt. %) | 15 | 20 | 0 | 10 | 15 | 20 | 0 | 15 | 20 | 0 | 15 |
| | Sample of Component B | T-1 | T-1 | U-1 | U-1 | T-II | T-II | U-II | t | t | u | u |
| | Type of Component B | Ionically Crosslinked Product | | | | | | | Unmodified Block Copolymer | | | |
| | Amount of Component B (wt. %) | 70 | 80 | 90 | 85 | 70 | 80 | 90 | 70 | 80 | 90 | 85 |
| Butadiene Content of Composition* (wt. %) | | 24.8 | 27.5 | 18.3 | 17.0 | 25.0 | 27.7 | 18.4 | 25.2 | 28.0 | 18.5 | 17.2 |
| Physical Properties | Izod Impact Strength (kg · cm/cm, notched) | 3.8 | 3.6 | 4.0 | 3.4 | 3.6 | 3.3 | 3.9 | 2.9 | 2.7 | 2.8 | 2.4 |
| | Tensile Yield Strength (kg/cm²) | 218 | 204 | 285 | 296 | 215 | 206 | 279 | 195 | 190 | 262 | 268 |
| | Tensile Break Strength (kg/cm²) | 207 | 199 | 267 | 287 | 208 | 198 | 265 | 191 | 186 | 250 | 256 |
| | Elongation at Break (%) | 5 | 5 | 20 | 14 | 4 | 6 | 22 | 3 | 3 | 18 | 13 |

TABLE 11-continued

| Example No. | Example | | | | | | | Comparative Example | | | |
|---|---|---|---|---|---|---|---|---|---|---|---|
| | 22 | 23 | 24 | 25 | 26 | 27 | 28 | 16 | 17 | 18 | 19 |
| Haze (%) | 8.0 | 4.6 | 7.8 | 4.5 | 8.3 | 4.4 | 8.1 | 7.6 | 5.0 | 8.2 | 4.1 |

*Content of butadiene (5 Wt. %) contained in high-impact polystyrene is included.

EXAMPLES 29 AND 30 AND COMPARATIVE EXAMPLE 20

The compositions of Examples 29 and 30 and Comparative Example 20 were prepared by using, as component B, the ionically crosslinked product sample V-I and, for comparative purposes, the unmodified block copolymer sample v and using, as component A, acrylonitrile-styrene copolymer resin (AS resin TYRIL 769 ® available from Asahi Dow Co., $\overline{Mw}=110,000$). The components A and B were extruded by using a 30 mm extruder at a temperature of 200° C. and the resultant compositions were compression molded. The physical properties of the molded compositions thus obtained are shown in Table 12 below.

It should be noted from the results in Table 12 that the compositions of Examples 29 and 30, as compared with the composition of Comparative Example 20, have an excellent impact resistance and also have similar or better transparency.

TABLE 12

| Example No. | | Example 29 | Example 30 | Comparative Example 20 | Reference 3 |
|---|---|---|---|---|---|
| Composition | Amount of Component A (AS Resin) (wt. %) | 66 | 50 | 66 | 100 |
| | Sample No. of Component B | V-I | V-I | v | — |
| | Type of Component B | Ionically Crosslinked Product | | Unmodified Copolymer | — |
| | Amount of Component B (wt. %) | 34 | 50 | 34 | — |
| Butadiene Content of Composition (wt. %) | | 10.9 | 15.9 | 10.9 | — |
| Physical Properties | Izod Impact Strength (kg . cm/cm, notched) | 3.5 | 7.6 | 2.3 | 1.0 |
| | Tensile Yield Strength (kg/cm²) | 378 | 207 | 350 | — |
| | Tensile Break Strength (kg/cm²) | 350 | 225 | 337 | 650 |
| | Elongation at Break (%) | 25 | 20 | 21 | 3 |
| | Haze (%) | 5.4 | 8.5 | 5.6 | 1.5 |

EXAMPLE 31 AND COMPARATIVE EXAMPLE 21

The compositions of Example 31 and Comparative Example 21 were prepared by using, as component B, the ionically crosslinked product sample P-V and, for comparative purposes, the unmodified block copolymer sample p and using, as component A, methylmethacrylate-styrene copolymer (MS Resin, comonomer ratio=50/50, $\overline{Mw}=150,000$). The components A and B were kneaded in the ratio shown in Table 13 by using a mixing roll at a temperature of 180° C. for 10 min. The physical properties of the compression molded compositions thus obtained are shown in Table 13 below.

It should be noted from the results in Table 13 that the composition of Example 31 has an improved impact resistance and similar or better transparency, as compared with the composition of Comparative Example 21 and also has a remarkably improved impact resistance as compared with the styrene-methyl methacrylate copolymer shown, as Reference 4, in Table 13. Thus, it is clear that the ionically crosslinked product is useful for improving the impact resistance of styrene-methyl methacrylate copolymer.

TABLE 13

| Example No. | | Example 31 | Comparative Example 21 | Reference 4 |
|---|---|---|---|---|
| Composition | Amount of Component A (wt. %) | 75 | 75 | 100 |
| | Sample No. of Component B | P-V*¹ | p*² | — |
| | Amount of Component B (wt. %) | 25 | 25 | — |
| Butadiene Content of Composition (wt. %) | | 15.3 | 15.5 | 0 |
| Physical Properties | Izod Impact Strength (kg . cm/cm, notched) | 3.1 | 1.8 | 1.2 |
| | Tensile Yield Strength (kg/cm²) | 209 | 201 | — |
| | Tensile Break Strength (kg/cm²) | 216 | 210 | 270 |
| | Elongation at Break (%) | 9 | 7 | 1.5 |
| | Haze (%) | 9.8 | 10.0 | 2.2 |

*¹Ionically crosslinked product
*²Unmodified block copolymer

EXAMPLE 32 AND COMPARATIVE EXAMPLE 22

The compositions of Example 32 and Comparative Example 22 were prepared by using, as component B, the ionically crosslinked product sample P-VI and, for comparative purposes, the unmodified block copolymer sample p and using, as component A, ABS resin (STYLAC 101 ® available from Asahi Dow Co., $\overline{Mw}$ of resin component=90,000). The components A and B were kneaded in the ratio shown in Table 14 by using a Brabender Plastograph at a temperature of 200° C. The physical properties of the compression molded compositions thus obtained are shown in Table 14 below.

It should be noted from the results in Table 14 that the composition of Example 32, as compared with the composition of Comparative Example 22, has an improved impact resistance, while the tensile yield strength was similar. Thus, it is clear that the ionically crosslinked product remarkably improves the impact resistance as compared with the unmodified block copolymer.

TABLE 14

| Example No. | | Example 32 | Comparative Example 22 |
|---|---|---|---|
| Composition | Amount of Component A (wt. %) | 80 | 80 |
| | Sample No. of Component B | P-VI*[1] | P*[2] |
| | Amount of Component B (wt. %) | 20 | 20 |
| Physical Properties | Izod Impact Strength (kg . cm/cm, notched) | 20.7 | 13.5 |
| | Tensile Yield Strength (kg/cm$^2$) | 353 | 343 |
| | Tensile Break Strength (kg/cm$^2$) | 331 | 320 |
| | Elongation at Break (%) | 25 | 18 |

*[1] Ionically crosslinked product
*[2] Unmodified block copolymer

We claim:

1. A thermoplastic polymer composition comprising:
   (A) 1 through 99% by weight of a component A consisting essentially of at least one styrene polymer selected from the group consisting of polystyrene and styrene-containing copolymers having a weight-average molecular weight of 50,000 through 500,000; and
   (B) 99 through 1% by weight of a component B consisting essentially of at least one ionically crosslinked product of at least one modified block copolymer with at least one univalent, bivalent or trivalent metal ion, said modified block copolymer comprising a block copolymer of at least one aromatic vinyl compound and at least one conjugated diene compound onto which at least one molecular unit containing at least one dicarboxylic acid group or the derivative thereof is grafted.

2. A composition as claimed in claim 1, wherein said styrene polymer contains at least 50% by weight of styrene.

3. A composition as claimed in claim 2, wherein said styrene polymer is at least one member selected from the group consisting of polystyrene, high-impact polystyrenes, acrylonitrile-styrene copolymers, methyl methacrylate-styrene copolymers, maleic anhydride-styrene copolymers and ABS resins.

4. A composition as claimed in claim 1, wherein said component A consists essentially of polystyrene and high-impact polystyrene.

5. A composition as claimed in claim 1, wherein said component B consists essentially of at least one ionically crosslinked product of said at least one modified block copolymer with at least one univalent metal ion.

6. A composition as claimed in claim 5, wherein said ionically crosslinked product is derived from the reaction of (i) the modified block copolymer comprising a block copolymer of at least one aromatic vinyl compound and at least one conjugated diene compound onto which at least one molecular unit containing at least one dicarboxylic acid group or the derivative thereof is grafted with (ii) at least one metallic compound of univalent metal ion.

7. A composition as claimed in claim 6, wherein said modified block copolymer has 1 through 50 groups of dicarboxylic acid groups or the derivatives thereof per one molecule.

8. A composition as claimed in claim 7, wherein the derivatives of the dicarboxylic acid group are dicarboxylic anhydride groups.

9. A composition as claimed in claim 6, wherein the molar ratio of the metal component of the univalent metallic compound to the dicarboxylic acid or the derivative thereof is 0.1 through 3.0.

10. A composition as claimed in claim 6, wherein said metallic compound of univalent metal ion is selected from the group consisting of the hydroxides, alcoholates and carboxylates of univalent metals.

11. A composition as claimed in claim 10, wherein said metallic compound of univalent metal ion is a sodium or potassium compound.

12. A composition as claimed in claim 1, wherein said component B consists essentially of at least one ionically crosslinked product of said at least one modified block copolymer with at least one metal ion selected from the group consisting of bivalent and trivalent metal ions.

13. A composition as claimed in claim 12, wherein said ionically crosslinked product is derived from the reaction of (i) the modified block copolymer comprising a block copolymer of at least one aromatic vinyl compound and at least one conjugated diene compound onto which at least one molecular unit containing at least one dicarboxylic acid group or the derivative thereof is grafted with (ii) at least one metallic compound selected from the group consisting of metallic compounds of bivalent and trivalent metal ions.

14. A composition as claimed in claim 13, wherein said modified block copolymer has 1 through 50 groups of dicarboxylic acid groups or the derivatives thereof per one molecule.

15. A composition as claimed in claim 14, wherein the derivatives of the dicarboxylic and group are dicarboxylic anhydride groups.

16. A composition as claimed in claim 12, wherein the molar ratio of the metal component of the bivalent or trivalent metallic compound to the dicarboxylic acid or the derivative thereof is 0.1 through 3.0.

17. A composition as claimed in claim 12, wherein said metallic compound of univalent metal ion is selected from the group consisting of the hydroxides and carboxylates of bivalent or trivalent metals.

18. A composition as claimed in claim 1, wherein the content of the aromatic vinyl compound in the block copolymer of the aromatic vinyl compound and the conjugated diene compound is 5 through 70% by weight, based on the weight of the block copolymer.

19. A composition as claimed in claim 18, wherein the content of the conjugated diene compound in the composition is 2 through 40% by weight, based on the weight of the composition.

20. A composition as claimed in claim 19, wherein said styrene polymer forms a continuous phase and said ionically crosslinked product of the modified block copolymer forms a discontinuous phase in the form of regularly and irregularly shaped particles having an average diameter of 0.2 through 10 microns.

21. A composition as claimed in claim 18, wherein the content of the conjugated diene compound in the composition is more than 40% by weight but not more than 95% by weight, based on the weight of the composition.

22. A composition as claimed in claim 21, wherein the composition is an elastomeric composition.

23. A composition as claimed in claim 22, wherein the elastomeric composition has a hardness of 30 through 100 as determined according to a JIS-K-6301 method.

24. A composition as claimed in claim 1, wherein the content of the aromatic vinyl compound in the block copolymer of the aromatic vinyl compound and the conjugated diene compound is more than 70% by weight but not more than 95% by weight, based on the weight of the block copolymer.

25. A composition as claimed in claim 24, wherein said composition is substantially transparent.

26. A composition as claimed in claim 1, wherein said modified block copolymer is derived from the addition reaction of (i) the block copolymer of at least one aromatic vinyl compound and at least one conjugated diene compound with (ii) an unsaturated dicarboxylic acid or the derivative thereof under the condition that no substantial amount of free radicals is generated.

27. A composition as claimed in claim 26, wherein the unsaturated dicarboxylic acid or the derivative thereof is at least one member selected from the group consisting of maleic acid, fumaric acid and maleic anhydride.

28. A composition as claimed in claim 1, wherein said aromatic vinyl compound is styrene and said conjugated diene compound is butadiene.

* * * * *